United States Patent
Mann

[19]

[11] 3,808,750
[45] May 7, 1974

[54] DENTAL MODEL TRIMMER
[76] Inventor: Douglas M. Mann, 245 E. 63rd St., New York, N.Y. 10021
[22] Filed: Oct. 10, 1972
[21] Appl. No.: 296,030

[52] U.S. Cl. .............................................. 51/273
[51] Int. Cl. ........................................... B24b 55/06
[58] Field of Search .................... 51/268, 270, 273; 144/252 R; 15/352

[56] References Cited
UNITED STATES PATENTS

| | | | |
|---|---|---|---|
| 2,512,930 | 6/1950 | Gilmore | 51/273 |
| 2,594,456 | 4/1952 | Kroenlein | 15/352 UX |
| 1,237,793 | 8/1917 | Krantz | 15/352 |
| 2,414,056 | 1/1947 | Nieman | 51/273 UX |
| 2,958,164 | 11/1960 | Beyer et al | 51/268 |

FOREIGN PATENTS OR APPLICATIONS

| | | | |
|---|---|---|---|
| 423,479 | 1/1926 | Germany | 51/268 |
| 21,462 | 9/1912 | Great Britain | 51/268 |

*Primary Examiner*—Othell M. Simpson
*Attorney, Agent, or Firm*—Bauer & Amer

[57] ABSTRACT

A trimmer for dental models made of plaster or similar material, said trimmer being a self-contained, portable unit having a vacuum system to remove the dust of the trimmed material, said vacuum system including a filter, in bag form, supported within a scraping ring such that there is a comparatively large usable filtering surface. This surface is also readily scraped and thereby maintained effective. For both these and other reasons, the within trimmer requires minimum maintenance during prolonged intervals of use.

1 Claim, 3 Drawing Figures

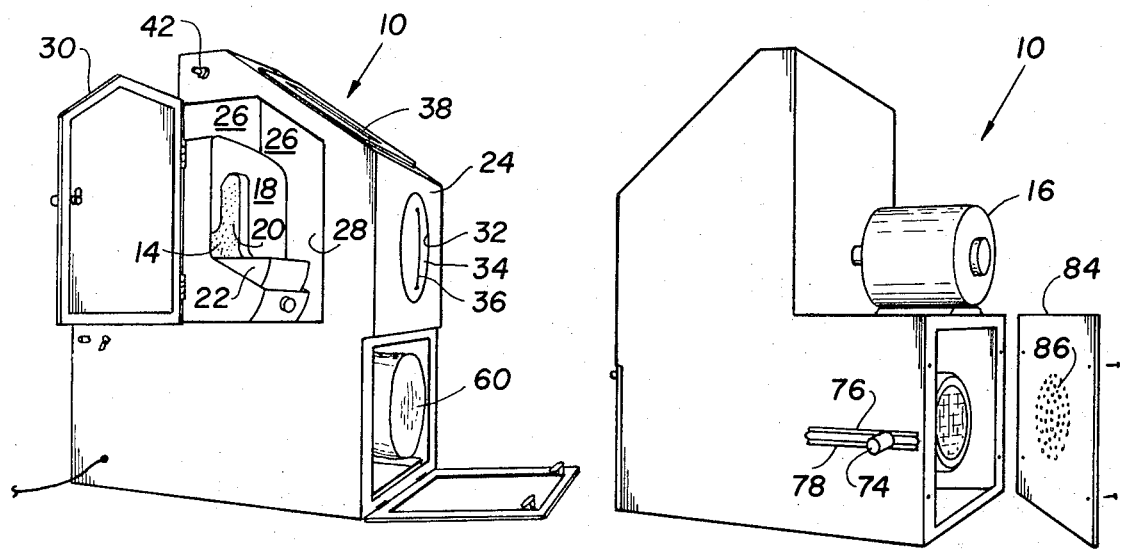

DENTAL MODEL TRIMMER

The present invention relates to improvements for a dental model trimmer, such as is used by dentists and dental laboratory technicians and the like, and more particularly to a dry, vacuum-induced dust removal system for this type of device.

To trim or grind the excess of plaster or other dental models, or to otherwise modify these structures, the model is placed in grinding relation against a rotary grinding wheel. According to present practice, the resulting dust or powder of the trimmed material is carried by water, serving as a flushing liquid, to a remote drainage location and thereby removed before it can contaminate the working area. Invariably, however, the dust results in clogging of the plumbing in the dentist's office or dental laboratory, and there is splashing of the operator and other inconveniences. Undoubtedly, a self-contained dry dust removal system, as herein proposed, was not felt to be practical because the dust of the trimmed material, particularly plaster, rapidly clogs any filter and the filter of such system would thus require supervision or maintenance at frequent intervals during its use.

Broadly, it is an object of the present invention to provide a dry dental model trimmer having none of the foregoing or other shortcomings. Specifically, it is an object to provide a relatively maintenance-free dust removal system in which the dust of the trimmed material is effectively filtered from a vacuum-induced air current by a filter surface requiring an optimum minimum amount of supervision because of its size, placement and the ease in which it is cleared of clogging dust.

A dry dust-removal system for a dental model trimmer demonstrating objects and advantages of the present invention includes a filter bag-supporting structure extending from the suction end of the vacuum motor and a filter bag in covering relation thereover so as to expose a comparatively large filtering surface to separate the dust from the dust-laden air being drawn into the vacuum motor. Disposed in concentric, scrapping relation about the bag is a ring which is readily moved, from time to time, along the bag to thereby unclog it of the plaster dust.

The above brief description, as well as further objects, features and advantages of the present invention, will be more fully appreciated by reference to the following detailed description of a presently preferred, but nonetheless illustrative embodiment in accordance with the present invention, when taken in conjunction with the accompanying drawings, wherein:

FIG. 1 is a front perspective view of a dental model trimmer according to the present invention;

FIG. 2 is a rear perspective view illustrating further details thereof; and

FIG. 3 is a sectioned side elevational view, on an enlarged scale, showing further structural features thereof.

Reference is now made to the drawings wherein there is shown a trimmer, generally designated 10, having specific application and utility as a device to be used by dentists and dental lab technicians in trimming or grinding the excess, or otherwise modifying, dental gypsum, plaster, and other ceramic dental models. During such grinding operations, use is made of a motor-operated wheel 12 having an abrasive surface 14 which the dental model is placed in contact with and which, in an obvious manner, performs a grinding function. Also as may be generally appreciated, during this time the trimmed or removed material is reduced to dust or powder form, thereby requiring proper containment and removal. According to present practice, such containment and removal is achieved using water as a flushing fluid to carry the dust and powder of the trimmed material, which is saturated with such fluid, to a drainage location. Although this technique is successful to a degree, it invariably results in clogging of the plumbing in either the dentist's office or the dental laboratory, and also results in spraying of the operator and other such inconveniences. An important contribution of the present invention is to provide a dry dust or powder removal system wherein use is made of a current of air to carry the dust or powder to a remote location for removal.

Device 10 is conventionally constructed in some aspects, such as in the rotary mounting of the grinding wheel 12 and the operative connection thereof with a motor 16. Also conventional is an inner housing 18 about the wheel 12 having an access opening 20 therein which exposes and permits access to the abrasive surface 14 preparatory to trimming or grinding the dental model (not shown). Assisting in placing the dental model in grinding relation to the revolving abrasive surface 14 is an adjustable pivotally mounted platform 22.

The structural features not found on prior art trimmers but which, according to the present invention, are embodied in the trimmer 10 includes an outer housing 24 which encloses the denture model trimming apparatus 14, 16, 18 and 20, said housing having walls 26 which bound a grinding chamber 28. A side door 30 provides access to the chamber 28. In the front of the housing 24 there is provided an arm opening 32 normally closed by a flexible closure 34 having a central slit 36. In practice, it is contemplated that the user will project his arm through the slit 36 and thus be able to hold the dental model in grinding relation against the grinding surface 14 and make necessary position adjustments guided by what is seen through the window 38. If need be, the grinding chamber 28 can be illuminated by energizing the light 40 using switch 42.

A vacuum created by vacuum motor 44, such as is conventionally embodied in a vacuum cleaner or the like, is utilized in accordance with the present invention to create an air current 46 having the flow path indicated by the arrows in FIG. 3. Specifically, this path advantageously originates at the opening consisting of the previously noted slit 36 and also advantageously utilizes the running clearance 48 of the grinding wheel 12 as an air passage to travel from the upper grinding chamber 28 to a dust-storage chamber 50 situated, as clearly illustrated in FIG. 3, directly below the chamber 28. More particularly, the suction end 52 of the vacuum motor 44 is mounted in a central opening of a vertical wall 54 so as to have communication with the chamber 50. In accordance with the present invention appropriately force fit or otherwise mounted as an extension to the suction end 52 of the motor 44 is a porous, cylindrical filter support 56. Disposed in covering relation about the support 56 is a filtering screen 58. In practice, it is contemplated that a filter bag 60 having a finess or porosity adequate to permit the passage of air therethrough but to block the passage of the plaster-like dust particles 62 will be disposed in covering relation about the screen 60. The open end 60, i.e., the end disposed about the motor suction end 52, is held about the suction end by any appropriate means, as for example, a contractable band 64.

Disposed in sliding relation along the filtering structure 56, 58 and 60, as just described, is a scraping ring 70 which is moved in opposite scraping directions 72 in response to manipulation of an external handle 74 movable between spaced apart guides 76 and 78, as illustrated in FIG. 2. Handle 74 will be understood to be connected to the ring 70 by an actuating rod 80. Thus, it is possible to actuate the ring 70 in scraping relation along the filter bag 60 which will result in the removal of any caked or clogging dust particles 62 from the filter bag 60 and the deposit thereof in a storage tray 82 which is emptied, also from time to time, upon removal of the housing back closure 84. This closure also includes exit openings 86 for the exhaust of the vacuum motor 44.

From the foregoing, it should be readily appreciated that there has been described herein a dental model trimmer 10 having a dry, vacuum-induced dust removal system, thereby eliminating all of the prior art problems attendant with the use of a flushing fluid to achieve this function. Moreover, by utilizing an elongated support structure 56 in covering relation about the vacuum motor suction end 52, there is a corresponding increase in the filtering surface 60 that can be utilized to separate the plaster-like dust 62 from the dust removal air stream 46. This in turn, in an obvious way, obviates the possibility of such an extensive clogging of the filtering surface that the operation of the vacuum motor 44 is adversely affected. Also, the manner in which the filter surface 60 is supported on the support 56 and screen 58 readily permits periodic scraping of this surface so as to maintain the effectiveness of the filtering surface.

A latitude of modification, change and substitution is intended in the foregoing disclosure, and in some instances some features of the invention will be employed without a corresponding use of other features. Accordingly, it is appropriate that the appended claims be construed broadly and in a manner consistent with the spirit and scope of the invention herein.

What is claimed is:

1. A dental model trimmer comprising, in combination, a motor-operated grinding wheel, a housing bounding a grinding chamber about said grinding wheel, an access opening into said grinding chamber for positioning a grindable dental model in grinding relation to said grinding wheel, and a dust removal means located in depending relation to said grinding wheel in said grinding chamber, said means comprising a vacuum source inlet, an elongated porous structure cylindrical in shape and having a free end extending in a clearance position from about said vacuum source inlet in covering relation over said vacuum source inlet, a dust filtering material in the form of a bag and having an operative position fitted over the free end of said cylindrical porous structure, and an operable means arranged to cause the removal of any dust which collects on said filter bag, said operable means including a handle which is accessible externally of said grinding chamber to facilitate dust-removal operation thereof and having a ring-like body of an oversized extent relative to said cylindrical porous structure, said ring being operatively arranged to partake of scraping movement along said filter bag in its supported position over said cylindrical porous structure.

* * * * *